(12) United States Patent
Ruehle

(10) Patent No.: US 7,177,301 B2
(45) Date of Patent: Feb. 13, 2007

(54) SIGNAL PERMUTING

(75) Inventor: Michael D. Ruehle, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 813 days.

(21) Appl. No.: 10/034,340

(22) Filed: Dec. 27, 2001

(65) Prior Publication Data
US 2003/0123439 A1 Jul. 3, 2003

(51) Int. Cl.
*H04L 12/66* (2006.01)
*H04Q 11/00* (2006.01)

(52) U.S. Cl. .................. 370/352; 370/388; 379/272

(58) Field of Classification Search ........ 370/360–361, 370/364–372, 386–388; 340/2.2–2.28
See application file for complete search history.

(56) References Cited

U.S. PATENT DOCUMENTS

| | | | |
|---|---|---|---|
| 4,495,615 A | | 1/1985 | Wilcke |
| 4,807,280 A | * | 2/1989 | Posner et al. ............. 379/272 |
| 4,833,468 A | * | 5/1989 | Larson et al. ............. 340/2.22 |
| 5,377,182 A | * | 12/1994 | Monacos ................. 370/219 |
| 5,532,855 A | * | 7/1996 | Kato et al. ................ 398/55 |
| 6,087,958 A | | 7/2000 | Artz |
| 6,215,786 B1 | * | 4/2001 | Larson et al. ............. 370/386 |
| 6,608,575 B2 | * | 8/2003 | Bazarjani ................. 341/143 |
| 6,657,998 B2 | * | 12/2003 | Li ........................... 370/360 |
| 6,721,311 B1 | * | 4/2004 | Samsudin et al. ......... 370/369 |
| 6,853,635 B1 | * | 2/2005 | Beshai .................... 370/351 |

FOREIGN PATENT DOCUMENTS

| WO | WO 98/20700 | 5/1998 |
|---|---|---|
| WO | WO 00/24224 | 4/2000 |

OTHER PUBLICATIONS

Thomas Cormen et al., "Introduction to Algorithms," 1996, MIT Press.
Jonathan Turner, "Design and Analysis of Switching System," http://boushi.arl.wustl.edu/~jst/cs/577/lec/chap4.pdf.
John Hennessy et al., "Computer Architecture A Quantitative Approach," 1996, Morgain Kaufmann Publishers, Inc.
Agrawal, J., et al., "A fast and low cost self-routing permutation network", *IEEE Transactions on Computers*, 47(9):1033-1036, Sep. 1998 (XP002236771).

* cited by examiner

*Primary Examiner*—Chi Pham
*Assistant Examiner*—Melanie Jagannathan
(74) *Attorney, Agent, or Firm*—Fish & Richardson P.C.

(57) ABSTRACT

A method of constructing a permuting network. A configuration for layers of a permuting network is selected based on a set of integer factors of N, the number of signals to be permuted, and on pre-selected types of switches. The permuting network is constructed in layers by using the pre-selected types of switches based on the selected configuration.

28 Claims, 9 Drawing Sheets

MAPPING GOAL

Input #1 : [1,1] ⟶ Output #1 : [3,1]
Input #2 : [2,1] ⟶ Output #2 : [2,3]
Input #3 : [3,1] ⟶ Output #3 : [3,2]

Input #4 : [1,2] ⟶ Output #4 : [3,4]
Input #5 : [2,2] ⟶ Output #5 : [2,1]
Input #6 : [3,2] ⟶ Output #6 : [3,3]

Input #7 : [1,3] ⟶ Output #7 : [1,1]
Input #8 : [2,3] ⟶ Output #8 : [2,2]
Input #9 : [3,3] ⟶ Output #9 : [1,2]

Input #10 : [1,4] ⟶ Output #10 : [1,3]
Input #11 : [2,4] ⟶ Output #11 : [2,4]
Input #12 : [3,4] ⟶ Output #12 : [1,4]

FIG. 4A

SWITCH SEQUENCE

[1,1] → [3,1] → [3,1] → [3,1]
[2,1] → [2,1] → [2,3] → [2,3]
[3,1] → [1,1] → [1,2] → [3,2]

[1,2] → [1,2] → [1,4] → [3,4]
[2,2] → [2,2] → [2,1] → [2,1]
[3,2] → [3,2] → [3,3] → [3,3]

[1,3] → [1,3] → [1,1] → [1,1]
[2,3] → [2,3] → [2,2] → [2,2]
[3,3] → [3,3] → [3,2] → [1,2]

[1,4] → [1,4] → [1,3] → [1,3]
[2,4] → [2,4] → [2,4] → [2,4]
[3,4] → [3,4] → [3,4] → [1,4]

$L_1$ : Exchange first coordinate
$L_2$ : Exchange second coordinate
$L_3$ : Exchange first coordinate

FIG. 4B

SIGNAL PERMUTING

TECHNICAL FIELD

This invention relates to signal permuting.

BACKGROUND

Signal permuting is used to change the routing paths of signals to connect two interfaces whose sets of signal lines have different orderings. For example, as shown in FIG. 1A, if an interface 10 to input circuitry 11 has lines $L_0$ to $L_3$ that carry Control, Data 1, Data 2, and Ground signals, and a second interface 12 to output circuitry 13 has lines $L_0$ to $L_3$ that carry Data 1, Data 2, Ground, and Control signals, the input and output interfaces are coupled by a 4-by-4 permuting network 14 maps $[L_0, L_1, L_2, L_3]$ to $[L_3, L_0, L_1, L_2]$.

A permuting network can be implemented using switches. In FIG. 1B, the output of an n:1 switch 16 can reflect any one of its n inputs. By using a number of n:1 switches which receive the same set of n signals at their inputs, n signals can be permuted to any order at their output terminals. FIG. 1C shows a 2-by-2 permuting network implemented using two 2:1 switches 20, 22 that permutes the ordering of two signals $S_0$ and $S_1$.

An n:1 switch can be implemented using an n:1 multiplexer, a $2^n \times 1$ random access memory that has its contents written to reflect a single address input, or an n-input lookup-table in a field programmable gate array that is programmed to reflect any one of its inputs at its output. For each type of technology, the types of switches that can be most economically implemented may be different.

DESCRIPTION OF DRAWINGS

FIG. 4A is a diagram of a mapping between input and output terminals.

FIG. 4B is a diagram showing transition of position coordinates of signals.

DETAILED DESCRIPTION

The invention is directed towards construction of a permuting network using a predetermined set of building blocks. The building blocks are programmable switches of one or more type, each type being able to select one signal from among several signals. The permuting network is configured as a multidimensional switch array permuter (MSAP) that can permute the ordering of signals by programming the switches to select signals according to a permuting algorithm.

Figure 1A:
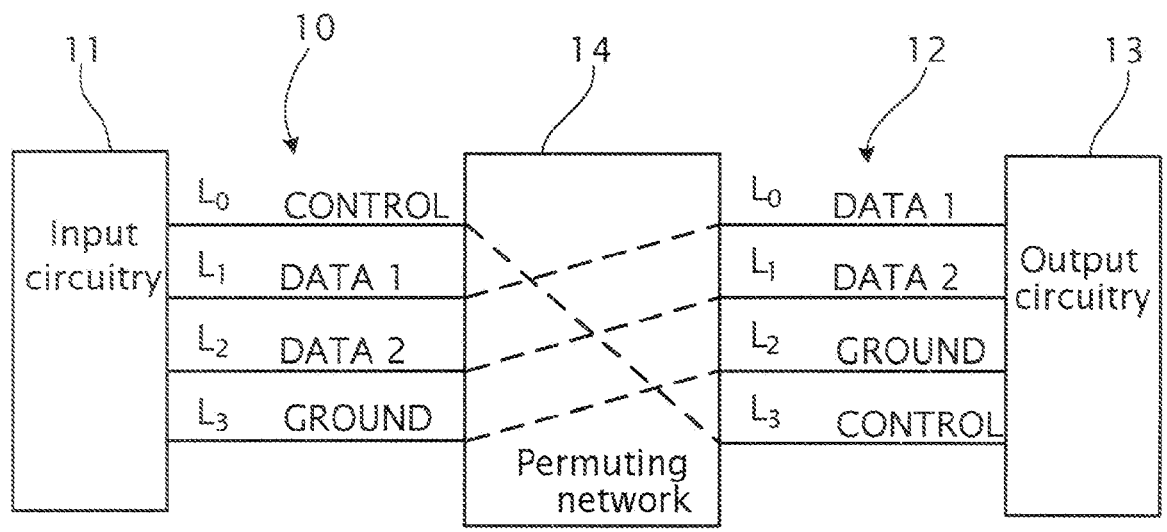
FIGS. 1A–1C are schematic diagrams of switches and permuting networks.
Figure 1B:
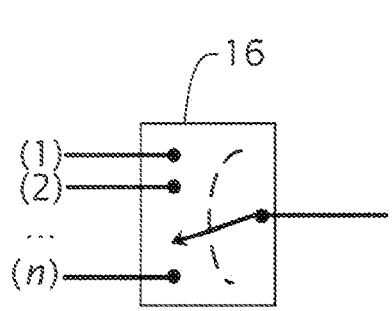
Figure 1C:
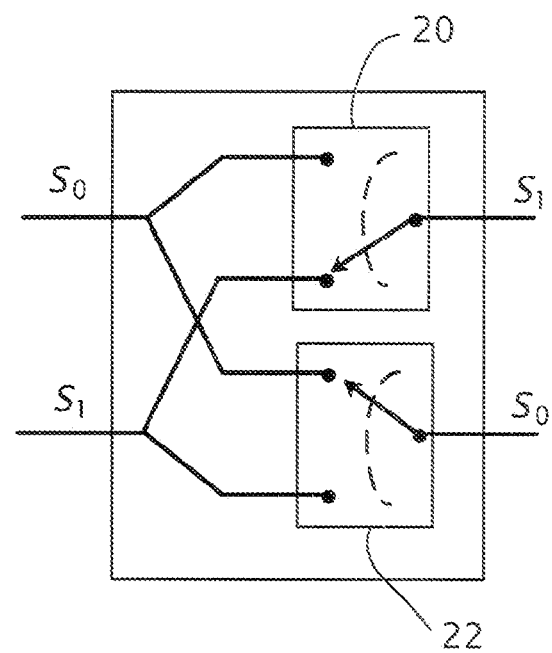
Figure 2:
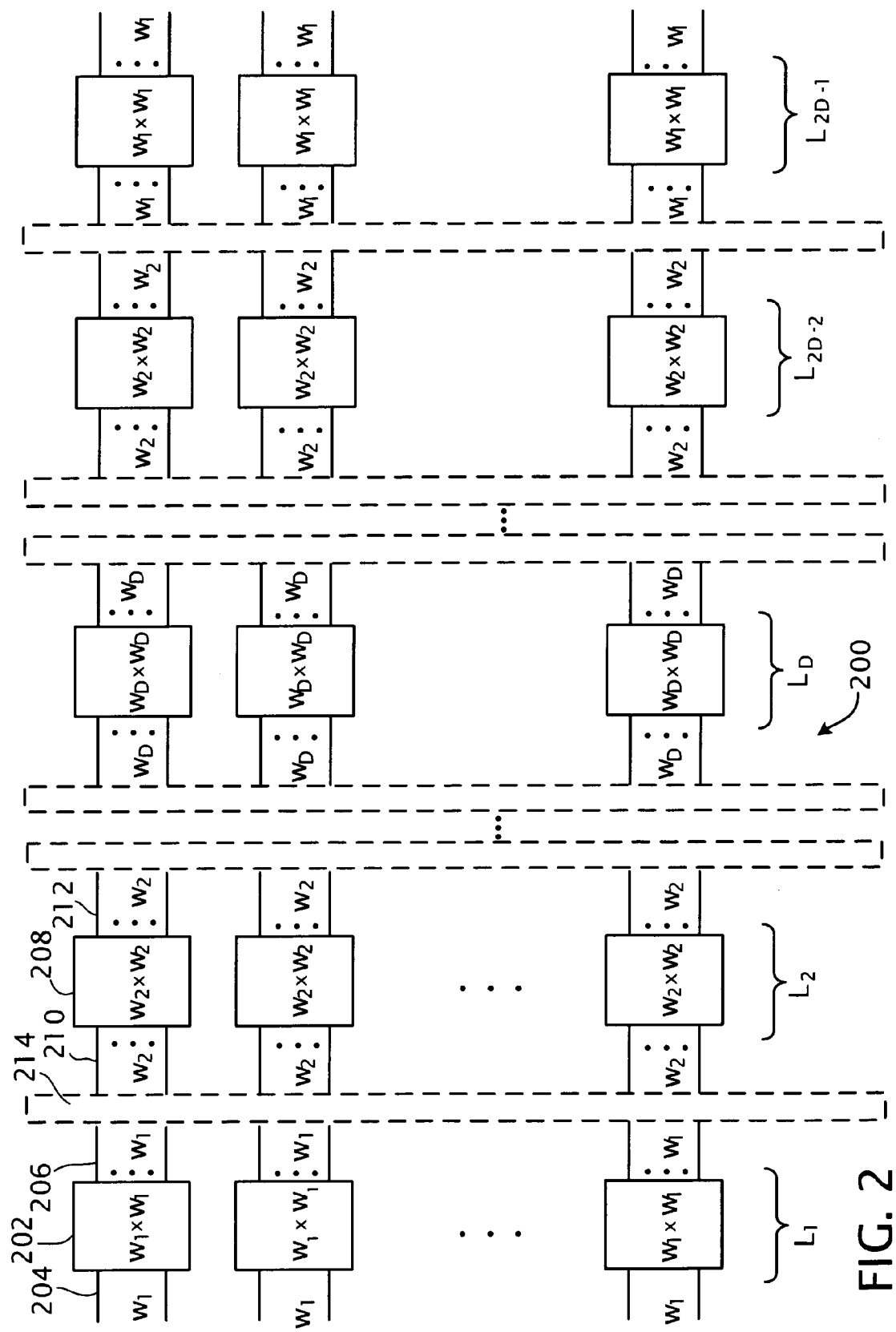
FIGS. 2, 3A, and 3B are schematic diagrams of permuting networks.

In the figures, each permuter has input terminals at its left and output terminals at its right. Referring to FIG. 2, a multidimensional switch array permuter (MSAP) 200 that can permute $N=\omega_1 \times \omega_2 \times \ldots \times \omega_D$ signals is implemented using 2D-1 layers of switches, layers $L_1$ through $L_{2D-1}$.

The numbers $\omega_1, \omega_2, \ldots, \omega_D$ are integers. Each layer contains the same number (N) of switches of the same type, but the types of switches may differ among different layers. For $\lambda=1$ to D, layer $L_\lambda$ includes $\omega_\lambda$:1 switches, each of which can select one signal from among $\omega_\lambda$ signals. For example, layer $L_1$ contains $\omega_1$:1 switches, layer $L_2$ contains $\omega_2$:1 switches, and layer $L_D$ contains $\omega_D$:1 switches. For $\lambda=D+1$ to 2D-1, layer $L_\lambda$ contains $(2D-\lambda)$:1 switches. For example, layer $L_{D+1}$ contains $\omega_{D-1}$:1 switches, and layer $L_{2D+1}$ contains $\omega_1$:1 switches. By appropriately connecting the output terminals of switches in one layer to the input terminals of switches in the next layer, and appropriately programming the switches to select input signals, MSAP 200 can permute the ordering of a set of signals at its input into any arbitrary ordering of the signals at its output.

The input signals of the switches in layer $L_1$ are the N input signals of the MSAP. The $\omega_1$:1 switches in the layer $L_1$ are configured to form a number of $\omega_1$-by-$\omega_1$ permuters 202, the number being $N/\omega_1$. Each $\omega_1$-by-$\omega_1$ permuter 202 includes a number of $\omega_1$:1 switches, the number being $\omega_1$. Each $\omega_1$-by-$\omega_1$ permuter 202 receives $\omega_1$ signals from the input terminals 204, and outputs a set of re-ordered $\omega_1$ signals on the output terminals 206. The output signals 206 of permuters 202 are sent to the input terminals of permuters in layer $L_2$. The $\omega_2$:1 switches in layer $L_2$ are configured to form a number of $\omega_2$-by-$\omega_2$ permuters 208, the number being $N/\omega_2$. Each $\omega_2$-by-$\omega_2$ permuter 208 receives $\omega_2$ signals at its input terminals 210, and outputs a set of re-ordered $\omega_2$ signals at its output terminals 212. The output signals of permuters 208 are sent to the input terminals of permuters in layer $L_3$, and so forth.

In general, the switches in layer $L_\lambda(\lambda=1$ to D) are grouped into $\omega_\lambda$-by-$\omega_\lambda$ permuters, each permuter receiving $\omega_\lambda$ signals from the previous layer and generating a set of re-ordered $\omega_\lambda$ signals at its output. The switches in layer $L_\lambda(\lambda=D+1$ to 2D-1) are grouped into $\omega_{2D-\lambda}$-by-$\omega_{2D-\lambda}$ permuters, each permuter receiving $\omega_{2D-\lambda}$ signals from the previous layer and generating a set of re-ordered $\omega_{2D-\lambda}$ signals at its output. The switch outputs in the last layer, $L_{2D-1}$, are the outputs of the MSAP, which is a set of re-ordered N signals.

The connections between the output terminals of one layer and the input terminals of the next layer are fixed (e.g., hardwired). The connections are represented by the regions 214 enclosed in dashed lines. The connections between each layer are configured so that each of the output signals of a permuter is sent to a different permuter in the next layer. Thus, each $\omega_\lambda$-by-$\omega_\lambda$ permuter receives $\omega_\lambda$ input signals from $\omega_\lambda$ different permuters in the previous layer, permutes the order of the $\omega_\lambda$ signals, and sends the re-ordered $\omega_\lambda$ signals to $\omega_\lambda$ different permuters in the next layer.

An advantage of the invention is that the MSAP can be designed and constructed using various types of switches, depending on which types are available. For example, to design an MSAP that can permute N signals, the factors $\omega_i$ of N are first determined. Usually the number N can be factored in many ways, each of which corresponds to a different design. For example, suppose the factors $\omega_i$ are chosen so that $N=\omega_1 \times \omega_2 \times \ldots \times \omega_D$, then a MSAP having D dimensions, with $\omega_\lambda$ being the width of the $\lambda$-th dimension can be designed. The meaning of "width" and "dimension" will be apparent from later descriptions.

For example, there are several MSAP configurations that can permute 48 signals:

A two-dimensional MSAP can be designed by choosing $N=48$, $D=2$, $\omega_1=6$, and $\omega_2=8$. The 48-by-48 MSAP can be built by using a first layer of 6:1 switches, a second layer of 8:1 switches, and a third layer of 6:1 switches.

A three-dimensional MSAP can be designed by choosing N=48, D=3, $\omega_1$=3, $\omega_2$=4, and $\omega_3$=4. The 48-by-48 MSAP can be built by using a first layer of 3:1 switches, second, third, and fourth layers of 4:1 switches, and a fifth layer of 3:1 switches.

A five-dimensional MSAP can be designed by choosing N=48, D=5, $\omega_1$32 2, $\omega_2$=2, $\omega_4$=2, and $\omega_5$=3. The 48-by-48 MSAP can be built using first through fourth layers of 2:1 switches, a fifth layer of 3:1 switches, and sixth through ninth layers of 2:1 switches.

The advantage is apparent when different environments (e.g., different technologies for implementing the switches, or different brands of products of the same technology) provide different types of switches, or allow different types of switches to be implemented most economically. For example, in one environment, the basic building block may be 2:1 switches, and all other n:1 switches are constructed from the 2:1 switches. In another environment, the basic building blocks may include both 2:1 and 3:1 switches, and larger switches are built from these two types of switches. An N-by-N MSAP may be constructed using building blocks that are the most economical for that particular environment.

Following the previous example, to permute 48 signals, it is also possible to select a configuration of MSAP in which N is chosen to be larger than 48, so that some MSAP inputs and outputs are left unused. This structure uses more logic circuits, but may allow certain MSAP configurations to be available. For example, by choosing N=64, the following three configurations can be used to construct a 64-by-64 MSAP:

N=64, D=2, $\omega_1$=8, $\omega_2$=8.
N=64, D=3, $\omega_1$=4, $\omega_2$=4, $\omega_3$=4.
N=64, D=6, $\omega_1$=2, $\omega_2$=2, $\omega_3$=2, $\omega_4$=2, $\omega_5$=2, $\omega_6$=2.

In general, for a particular environment, if larger switches have to be built from smaller switches, then to permute the same number (N) of signals, a higher dimensional MSAP using smaller switches will use less logic circuitry. In the above example, if the 8:1 and 4:1 switches have to be built from 2:1 switches, then among the three configurations, the six-dimensional MSAP using 2:1 switches is more economical (i.e., will use the smallest number of switches overall). Because the dimensional width $\omega_k$ is proportional to the sizes of switches, smaller switches and less logic circuitry can be used by choosing $\omega_1$, $\omega_2$, ... $\omega_D$ as close together in value as possible. For example, when N=$n^D$, the most economical configuration is to choose $\omega_1$=$\omega_3$= ... =$\omega_D$=n. For example, if larger switches have to be constructed from 2:1 switches, then the most efficient design for MSAP is to choose n=2 and use 2:1 switches as the basic building blocks of the MSAP. See Table 1 below for a comparison of the efficiency of MSAP's constructed using switches of various sizes.

Figure 3A:
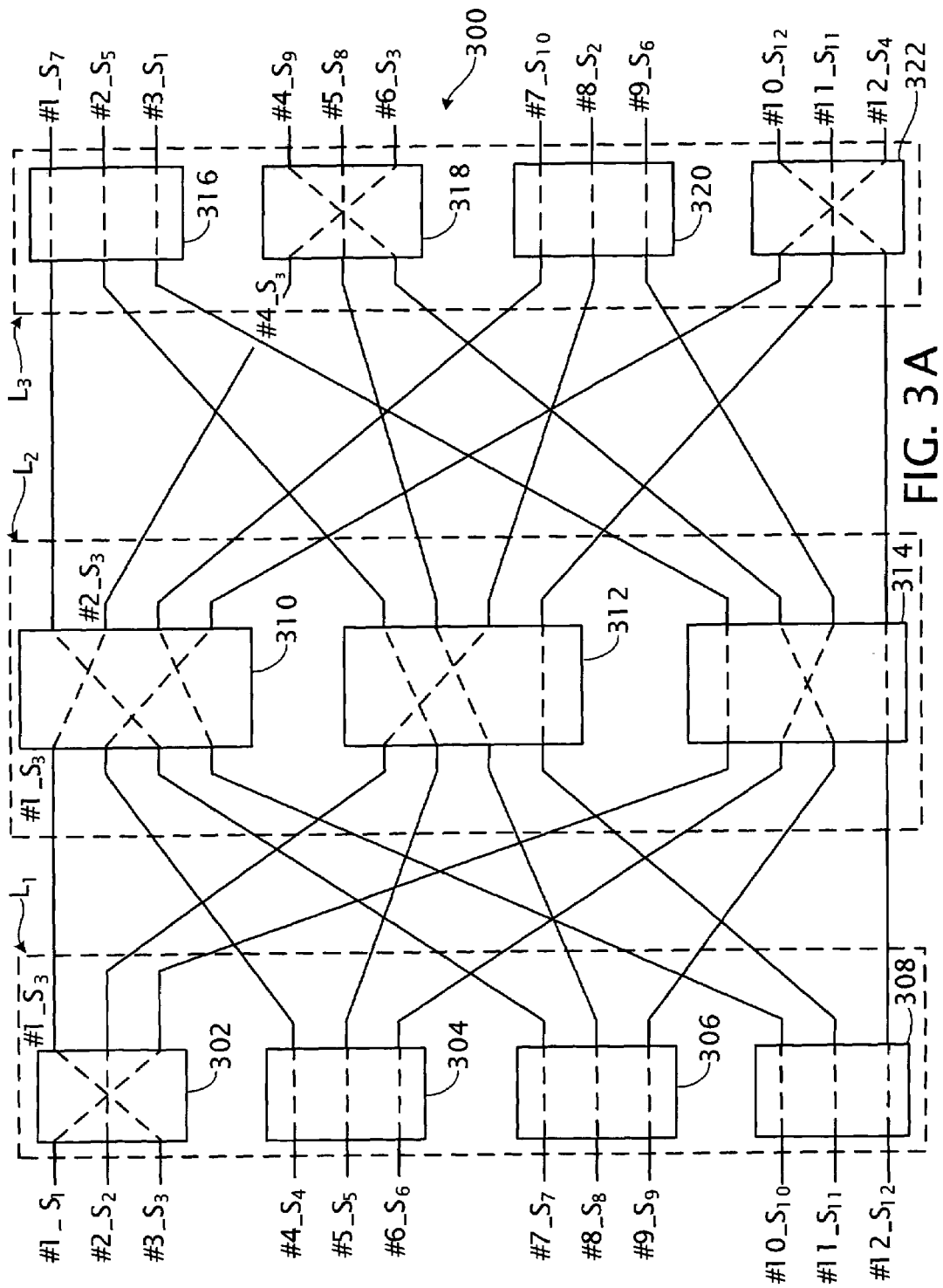

In the example shown in FIG. 3A, a 12-by-12 MSAP 300 is constructed from two layers of 3:1 switches and one layer of 4:1 switches. MSAP 300 includes layers $L_1$ to $L_3$. Layer $L_1$ includes 3:1 switches that are configured to form 3-by-3 permuters 302, 304, 306, and 308. Layer $L_2$ includes 4:1 switches that are configured to form 4-by-4 permuters 310, 312, and 314. Layer $L_3$ includes 3:1 switches that are configured to form 3-by-3 permuters 316, 318, 320, and 322. Within each permuter, different switches select different input signals so that there is no overlap in their selections, resulting in a re-ordering of the input signals appearing at the output terminals of the permuter.

Each 3-by-3 permuter in layer $L_1$ receives 3 signals at its input terminals, permutes the ordering of the 3 signals, and sends the re-ordered 3 signals to three different permuters in layer $L_2$. For example, the first output terminal of permuter 302 is connected to the first input terminal of permuter 310. The second output of permuter 302 is connected to the first input of permuter 312. The third output of permuter 302 is connected to the first input of permuter 314, and so forth. In this way, each of the three output signals of a permuter in the layer $L_1$ will be re-ordered by a different permuter in the layer $L_2$.

Likewise, each output of a permuter in the layer $L_2$ is connected to an input of a different permuter in layer $L_3$. Thus, each of the four output signals of a permuter in layer $L_2$ will be re-ordered by a different permuter in layer $L_3$. By properly re-ordering signals using each permuters, the 12-by-12 MSAP can re-order 12 input signals into any orderings of the 12 output signals.

As an illustration of how permuters re-order signals, dashed lines are shown inside each permuter representing routing of signals from input terminals to output terminals. Twelve input signals with the ordering [$S_1$, $S_2$, ... $S_{12}$] are re-ordered into ordering [$S_7$, $S_5$, $S_3$, $S_9$, $S_8$, $S_1$, $S_{10}$, $S_2$, $S_6$, $S_{12}$, $S_{11}$, $S_4$] at the output of MSAP 300. The following illustrates how signal $S_3$ is re-ordered from line #3 at the input terminal at the left of the figure to line #6 at the output terminal at the right of the figure. Permuter 302 re-orders signal $S_3$ from input #3 to output #1, which is connected to input #1 of permuter 310. Permuter 310 re-orders signal $S_3$ from input #1 to output #2, which is connected to input #4 of permuter 318. Permuter 318 then re-orders signal $S_3$ from input #4 to output #6. The inputs and outputs of the permuters in each layer are numbered #1 to #12 from top to bottom in the figure.

The following describes the connections between the output terminals of switches in one layer and the input terminals of switches in the next layer. These connections are fixed (e.g., hardwired). For description purposes, the switches in each layer of the MSAP are said to form a D-dimensional array. The switches in layer $L_\lambda$ are denoted as $S[\lambda][x_1, x_2, ... x_D]$, with $1 \square x_k \square \omega_k$, k ranging from 1 to D. The number $x_1$ represents the $1^{st}$ dimension coordinate of the switch, the number $X_2$ represents the $2^{nd}$ dimension coordinate, and so forth. The inputs to these switches will be denoted by adding subscripts to the ends of switch names. For example, switch S[1][2,3,4] has inputs S[1][2,3,4]$_1$, S[1][2,3,4]$_2$, etc. The outputs will be donoted by adding an asterisk (e.g. S[1][2,3,4]*).

The output signals of the MSAP are the outputs of the last layer $L_{2D-1}$, i.e., the MSAP outputs are S[2D-1][$x_1$, $x_2$, ..., $x_D$]* for the various combinations of $x_1$, $x_2$, ... $x_D$. To simplify description of notation for the switches, a fictional layer $L_0$ is used so that the MSAP inputs are the $L_0$ outputs. Thus, the MSAP inputs are S[0][$x_1$, $x_2$, ..., $x_D$]* for the various combinations of $x_1$, $x_2$, ..., $x_D$. Although there is no switch S[0][1, ..., 1], there is a signal S[0][1, ... 1]*, which is the MSAP input.

For $\lambda$=1, 2, ..., D, the permuters in layer $L_\lambda$ arbitrarily permute the outputs of the permuters in the previous layer along dimension $\lambda$ only. This means that the switches in a permuter in layer $L_\lambda$ only receive signals from switches in the previous layer having labels that are different in dimension $\lambda$, and only permute those signals. Each of the $\omega_\lambda$.1 switches in layer $L_{80}$ ($\lambda \square$D), denoted S[$\lambda$][$x_1$, $x_2$, ..., $x_D$], has $\omega_\lambda$ inputs, i.e., S[$\lambda$][$x_1$, $x_2$, ..., $x_D$]$_1$, S[$\lambda$][$x_1$, $x_2$, ..., $x_D$]$_2$, ..., S[$\lambda$][$x_1$, $x_2$, ..., $x_D$]($\omega_\lambda$). These inputs map to all the outputs of the previous layer with switch coordinates differing only in dimension λ:

$$S[\lambda][x_1,x_2,\ldots,x_\lambda,\ldots,x_D]_1 = S[\lambda-1][x_1,x_2,\ldots,1,\ldots,x_D]*$$

$$S[\lambda][x_1,x_2,\ldots,x_\lambda,\ldots,x_D]_2 = S[\lambda-1][x_1,x_2,\ldots,2,\ldots,x_D]*$$

$$S[\lambda][x_1,x_2,\ldots,x_\lambda,\ldots,x_D](\omega_\lambda) = S[\lambda-1][x_1,x_2,\ldots,\omega_\lambda,\ldots,x_D]*$$

$$(1 \leq \lambda \leq D;\ \text{any}\ x_1, x_2, \ldots, x_D)$$

For $\lambda = D+1, D+2, \ldots, 2D-1$, layer $L_\lambda$ arbitrarily permutes the outputs of the previous layer along dimension $2D-\lambda$ only. This means that the switches in a permuter in layer $L_\lambda$ only receive signals from switches in the previous layer having labels that are different in dimension $2D-\lambda$, and only permute those signals. Each of the $\omega_{2D-\lambda}:1$ switches in layer $L_\lambda (\lambda > D)$, denoted $S[\lambda][x_1, x_2, \ldots, x_D]$, has $\omega_{2D-\lambda}$ inputs, i.e., $S[\lambda][x_1, x_2, \ldots, x_D]_1, S[\lambda][x_1, x_2, \ldots, x_D]_2, \ldots, S[\lambda][x_1, x_2, \ldots, x_D](\omega_{2D-\lambda})$. These inputs map to all the outputs of the previous layer with switch coordinates differing only in dimension $2D-\lambda$:

$$S[\lambda][x_1,x_2,\ldots,x_{2D-\lambda},\ldots,x_D]_1 = S[\lambda-1][x_1,x_2,\ldots,1,\ldots,x_D]*$$

$$S[\lambda][x_1,x_2,\ldots,x_{2D-\lambda},\ldots,x_D]_2 = S[\lambda-1][x_1,x_2,\ldots,2,x_D]*$$

$$S[\lambda][x_1,x_2,\ldots,x_{2D-\lambda},\ldots,x_D](\omega_{2D-\lambda}) = S[\lambda-1][x_1,x_2,\ldots,\omega_{2D-\lambda},\ldots,x_D]*$$

$$(D+1 \leq \lambda \leq 2D-1;\ \text{any}\ x_1, x_2, \ldots, x_D)$$

Figure 3B:
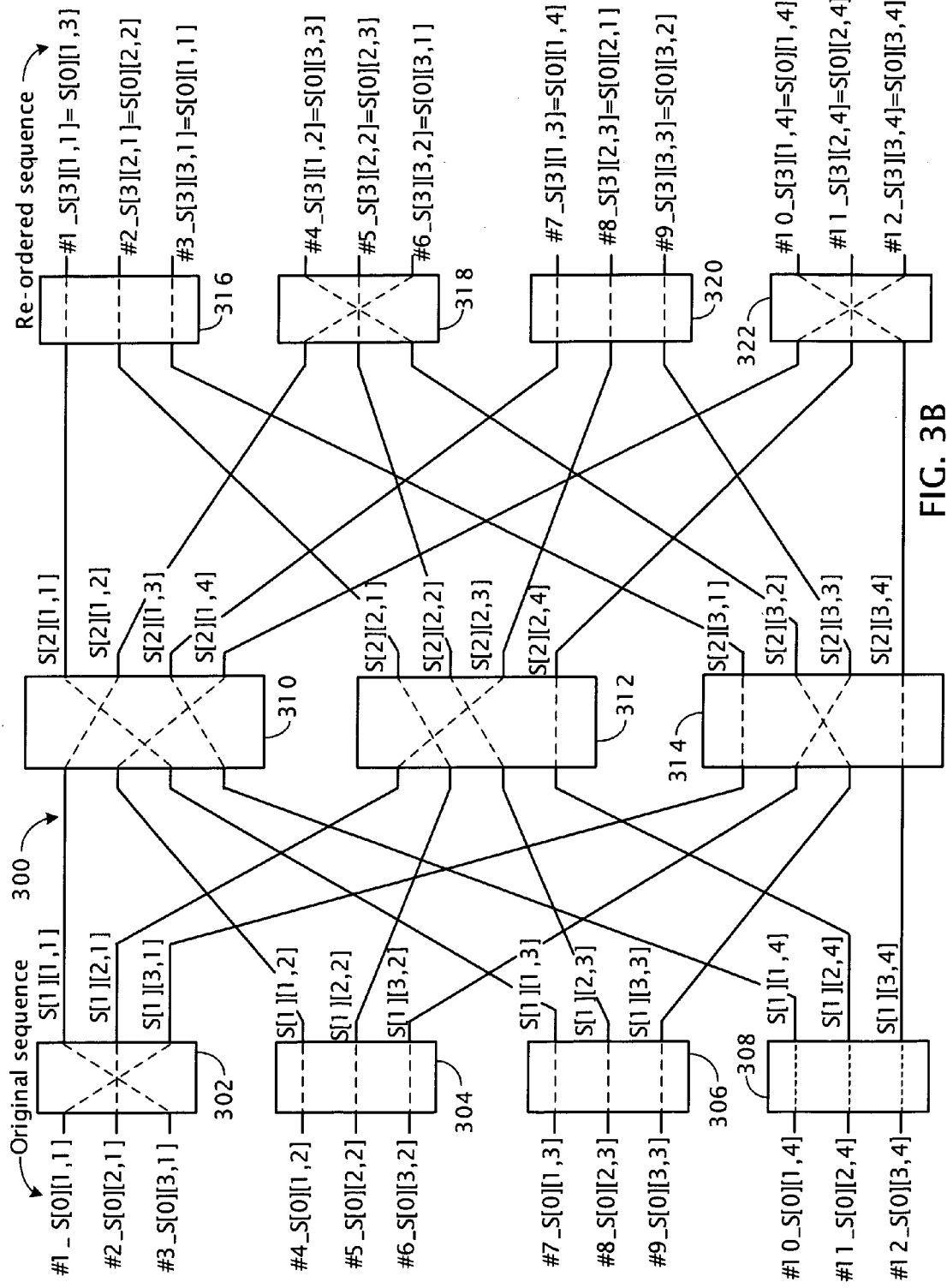

Referring to FIG. 3B, the switches in MSAP 300 have been labeled as $S[\lambda][x_1, x_2]$, $\lambda$ ranging from 1 to 3, $x_1$ ranging from 1 to 3, and $x_2$ ranging from 1 to 4. For convenience of notation, the MSAP input signals are described as the output signals of layer $L_0$, and are labeled as $S[0][i,j]*$, $i$ ranging from 1 to 3, and $j$ ranging from 1 to 4. Layer $L_1$ permutes the signals along the first dimension. This means that the switches in layer $L_0$, whose outputs are connected to the inputs of a switch in layer $L_1$, have labels with different coordinates in the first dimension but same coordinates in the second dimension. For example, the three inputs of switch $S[1][2,3]$ are connected to outputs of switches in layer $L_0$ as follows:

$$S[1][2,3]_1 = S[0][1,3]*$$

$$S[1][2,3]_2 = S[0][2,3]*$$

$$S[1][2,3]_3 = S[0][3,3]*$$

Layer $L_2$ permutes the signals along the second dimension. This means that the switches in $L_1$, whose outputs are connected to the inputs of a switch in $L_2$, have labels with different coordinates in the second dimension but same coordinates in the first dimension. For example, switch $S[2][2,3]$ has its four inputs connected as follows:

$$S[2][2,3]_1 = S[1][2,1]*$$

$$S[2][2,3]_2 = S[1][2,2]*$$

$$S[2][2,3]_3 = S[1][2,3]*$$

$$S[2][2,3]_4 = S[1][2,4]*$$

Layer $L_3$ permutes the signals along the first dimension. For example, switch $S[3][2,3]$ has its three inputs connected as follows:

$$S[3][2,3]_1 = S[2][1,3]*$$

$$S[3][2,3]_2 = S[2][2,3]*$$

$$S[3][2,3]_3 = S[2][3,3]*$$

The output signals of MSAP 300 are the 12 switch outputs from layer $L_3$, i.e., $S[3][1,1]*$ through $S[3][3,4]*$.

An MSAP switch topology has a recursive structure. If the first and last layers of switches ($L_1$ and $L_{2D-1}$) are removed from an MSAP of dimension $D>1$, the remaining portion is a number of smaller MSAP's of dimension $D-1$, the number being $\omega_1$. In general, in an MSAP with dimension $D>1$, for each fixed coordinate c between 1 and $\omega_1$, in the first dimension, the subset of switches $\{S[\lambda][c, x_2, x_3, \ldots, x_D]\}$ ($\lambda$ ranging from 2 to $2D-2$ and each $x_k$ ranging from 1 to $\omega_k$) forms a sub-MSAP of dimension $D-1$ with dimensional widths $\omega_2, \omega_3, \omega_D$. Each sub-MSAP has its own sub-MSAP's, and so forth, down to the level of one-dimensional MSAP's. This recursive structure of the MSAP is reflected in the MSAP switching algorithm described below.

The switches in an MSAP are configured according to a switching algorithm so that the MSAP can permute signals in any chosen order. To facilitate description of the algorithm, each input signal to the MSAP is described as having a starting position and a target position. The position of a signal in a particular layer is written as $[x_1, x_2, \ldots, x_D]$, and corresponds to the label of the switch that selected the signal as output. For example, in FIG. 3B, the signal at input line #3 has a starting position of [3,1] because the signal is selected by switch $S[0][3,1]$ and reflected at its output. As described previously, layer $L_0$ is a fictional layer and used just for convenience of description. When the signal propagates to layer $L_1$, its position changes to [1,1] because the signal is selected by switch $S[1][1,1]$. When the signal propagates to layer $L_2$, its position changes to [1,2] because the signal is selected by switch $S[2][1,2]$. Then in layer $L_3$, the position of the signal changes to [3,2] because the signal is selected by switch $S[3][3,2]$.

In a three dimensional (D=3) MSAP, suppose an input signal has a starting position of [2,5,3] and a target position of [4,1,6]. This means that the MSAP switches must be set in a manner so that the input signal $S[0][2,5,3]*$ is routed to the output signal $S[5][4,1,6]*$. As a signal propagates through the MSAP, the signal's position is adjusted in each switch layer, reflecting the switches that the signal has propagated through. Because each layer only permutes the signals in one dimension, only one coordinate of the signal's position is adjusted in a layer. For example, in the D=3 MSAP, a signal may follow the position path:

$L_0$:[2,5,3]

$L_1$:[8,5,3]

$L_2$:[8,7,3]

$L_3$:[8,7,6]

$L_4$:[8,1,6]

$L_5$:[4,1,6]

This position path determines how one switch in each layer must be set. In order that the signal propagates from $L_0$ position [2,5,3] to $L_1$ position [8,5,3], switch $S[1][8,5,3]$ must be set to position 2. In order that the signal propagates from $L_1$ position [8,5,3] to $L_2$ position [8,7,3], switch S[2] [8,7,3] must be set to position 5, and so forth. When all of the position paths for the MSAP's input signals have been determined, all of the switches in the MSAP can be set so that all input signals are routed to the proper output terminals of the MSAP. Thus, a collection of N position paths (or signal paths) can be used to determine a switch-setting configuration for an MSAP.

The MSAP Switching Algorithm

The MSAP switching algorithm provides a way of configuring an MSAP to route input signals to achieve every possible signal permutation at the output terminals. However, the configuration provided by the switching algorithm is not the only way that an MSAP can be configured to permute signals. It is possible to use a "brute-force" method by looking through all possible switching combinations in some intelligent (e.g., recursive) manner to find a solution.

The MSAP switching algorithm includes Algorithm 1, which calls Algorithm 2. In the description of Algorithm 1 below, the MSAP switching procedures are described in terms of signal position paths rather than in terms of MSAP switch settings. There are N signals, each of which has a D-dimensional starting position and a D-dimensional target position. Algorithm 1 determines the position paths for all the signals, giving each signal's position coordinates in each layer from $L_0$ to $L_{2D-1}$ in a manner that is allowed by the MSAP topology. No two signals can occupy the same position in any layer. The $L_0$ position of each signal is its starting position. The $L_{2D-1}$ position of each signal generated by Algorithm 1 will match the signal's target position.

Algorithm 1

Algorithm 1 calls itself recursively. Each time Algorithm 1 is called, a parameter $\Sigma$ that represents a subset of the input signals is passed on to Algorithm 1. When Algorithm 1 is called initially, parameter $\Sigma=\{$all the signals$\}$ is passed to Algorithm 1. In subsequent recursive calls, parameter $\Sigma$ will contain successively smaller subsets of signals. Algorithm 1 keeps track of the depth of its recursion by passing a level parameter $\lambda$. When Algorithm 1 is initially called, parameter $\lambda=1$ is given to the algorithm. When Algorithm 1 calls itself again, parameter $\lambda=2$ is passed, and so forth.

For any given N, D, $\omega_1, \omega_2, \ldots,$ and $\omega_D$ such that $N=\omega_1 \times \omega_3 \times \ldots \times \omega_D$, Algorithm 1 performs the steps below using the parameter $\lambda$ to represent the recursion depth and $\Sigma$ to represent the subset of signals to operate on. Initially, set $\lambda=1$.

Step 1: If $\lambda=D$, jump to step 5.

Step 2: Copy the $L_{\lambda-1}$ position of each signal in $\Sigma$ to its $L_\lambda$ position.

Step 3: Call Algorithm 2 to permute the $L_\lambda$ positions of signals in $\Sigma$, changing only the $\lambda^{th}$ position coordinate of each signal, in such a way that no two signals in $\Sigma$ with the same $\lambda^{th}$ position coordinate have identical $(\lambda+1)^{st}$ to $D^{th}$ target coordinates.

Step 4: For each c, ranging from 1 to $\omega_\lambda$, recursively call Algorithm 1, passing parameters:

$\Sigma=$the subset of signals in $\Sigma$ which have $\lambda^{th}$ position coordinates equal to c in layer $L_\lambda$; and $\lambda=\lambda+1.$ Step 5: Permute the signals in $\Sigma$ from their positions in $L_{2D-\lambda-1}$ to new positions in $L_{2D-\lambda}$, by changing the $\lambda^{th}$ position coordinate of each signal to its $\lambda^{th}$ target coordinate.

The permutations performed in Steps 3 and 5 of Algorithm 1 permutes signals only along a particular dimension allowable for that layer. For example, the switches in layer $L_k$ permute signals only along dimension k. Algorithm 1 also follows the rule that no two signals occupy the same position in a given layer. This rule can be ensured because Algorithm 2, as described below, moves signals by swapping pairs of signals, thereby preventing collisions of signals (i.e., two signals being selected by the same switch).

Algorithm 2

The following is a description of Algorithm 2 called by Step 3 of Algorithm 1. Due to the recursive nature of Algorithm 1, in layer $L_\lambda$, all the signals in $\Sigma$ will have the same $1^{st}$ to $(\lambda-1)^{st}$ position coordinates. Their $\lambda^{th}$ to $D^{th}$ position coordinates, on the other hand, will run through all possible combinations. Thus, although each signal still has D position coordinates, $\Sigma$ is effectively a $(D-\lambda+1)$-dimensional array of signals according to positions in layer $L_\lambda$. The $\lambda^{th}$ position coordinate of each signal in $\Sigma$ determines the "slice" of this array that signal is in. The $(\lambda+1)^{st}$ to $D^{th}$ position coordinates of each signal determine the "column" of the array that the signal is in. The definitions of "slice" and "column" are given later. Two signals with the same $\lambda^{th}$ position coordinates are in the same slice, and two signals with identical $(\lambda+1)^{st}$ to $D^{th}$ position coordinates are in the same column. Thus, the array of signals in $\Sigma$ is divided into $\omega_\lambda$ different slices, numbered 1 through $\omega_\lambda$. The array is also divided into $\omega_{\lambda+1} \times \omega_{\lambda+2} \times \ldots \times \omega_D$ different columns, not numbered. Step 3 of Algorithm 1 only changes the $\lambda^{th}$ position coordinate of each signal so that a signal only moves within its column.

The following is a description of the terms "slice" and "column." A slice is a subset of the available position coordinates containing subsets of $\Sigma$ of signals that are processed by Algorithm 2. For example, consider an MSAP with D=5, $\omega_1=6, \omega_2=5, \omega_3=4, \omega_4=3,$ and $\omega_5=2$. In this case, a total of $6 \times 5 \times 4 \times 3 \times 2 = 720$ signals are permuted, each of which has 5-dimensional starting position coordinates and 5-dimensional target position coordinates. For example, the signal starting in one position [1,1,1,1,1] may have a target position [6,5,4,3,2]. Suppose Algorithm 2 is called when $\lambda=3$, representing the $3^{rd}$ level of recursion in Algorithm 1. In this case, $\Sigma$ is a subset of signals with constant $L_2$ position coordinates in dimensions 1 and 2. For example, all the signals in $\Sigma$ may have $L_2$ position coordinates of the form [4,2,_,_,_], so that $\Sigma$ contains exactly $4 \times 3 \times 2 = 24$ signals: [4,2,1,1,1], . . . ,[4,2,4,3,2].

In Step 2 of Algorithm 1, the $L_2$ positions of the signals in $\Sigma$ are copied to their $L_3$ positions, so the $L_3$ positions of the 24 signals are also of the form [4,2,_,_,_]. Algorithm 2 is called to rearrange the 24 signals in $\Sigma$ within layer $L_3$, i.e., Algorithm 2 changes the $L_3$ position coordinates of the 24 signals in $\Sigma$. Algorithm 2 divides the 24 signals in $\Sigma$ into 4 "slices" and 6 "columns" based on their position coordinates. Each of the 4 slices have 6 signals, and each of the 6 columns have 4 signals.

The 4 slices contain those signals with a given $3^{rd}$ (since $\lambda=3$) $L_3$ position coordinate. There are 4 slices because $\lambda=3$ and $\omega_3=4$. The slices are called "slice 1" through "slice 4." Slice k contains those signals in $\Sigma$ whose $3^{rd}$ $L_3$ position coordinate is k. For example, slice 3 contains 6 signals whose $L_3$ position coordinates are [4,2,3,1,1], [4,2,3,1,2], [4,2,3,2,1], [4,2,3,2,2], [4,2,3,3,1], and [4,2,3,3,2]. During this call to Algorithm 2, the signals in slice 3 ha these six $L_3$ positions, although the particular signals occupying those positions may change.

When Algorithm 2 swaps two signals, those two signals will exchange slices, meaning that they will swap their $3^{rd}$ $L_3$-position coordinates. The 6 columns, meanwhile, contain hose signals with a given combination of $4^{th}$ and $5^{th}$ $L_3$ position coordinates (the coordinates above λ=3). Thus, there is a column whose signals have $L_3$ position coordinates [4,2,1,1,1], [4,2,2,1,1], [4,2,3,1,1] and [4,2,4,1,1]. There is another column whose signals have $L_3$ position coordinates [4,2,1,3,2], [4,2,2,3,2], [4,2,3,3,2] and [4,2,4,3,2]. The term "column," as used in this example, describes a set of $L_3$ position coordinates with their $4^{th}$ and $5^{th}$ dimension coordinates fixed. Thus, signals with $L_3$ position coordinates [4,2,2,3,1] and [4,2,4,3,1] are said to be in the "same column" because their $4^{th}$ and $5^{th}$ coordinates [3,1] match. In Algorithm 2, a column always retains the same set of signals after permutation because the swapping action only exchanges two signals in the same column.

Having described the definition of the terms "slice" and "column," the following is a description of the steps performed by Algorithm 2:

1. FOR S = 1 TO $w_λ$ − 1 DO:
2.   WHILE slice S contains at least 2 signals with identical $(λ+1)^{st}$ to $D^{th}$ target coordinates DO:
3.     SET $X_0$ = one of these signals
4.     FOR K = 0, 1, 2, . . . DO:
5.       Look for a signal Z in slices S+1 through $w_λ$ and in the same column as
        $X_K$ (selected in Step 3 or 6) with the following property:
        Z's $(λ+1)^{st}$ to $D^{th}$ target coordinates are not identical to the $(λ+1)^{st}$ to $D^{th}$ target coordinates of any signal in slice S. IF found THEN BREAK from the "FOR K" loop.
6.     Select a pair of signals signal $Y_{K+1}$ and $X_{K+1}$ with the following properties:
        $Y_{K+1}$ is in slices S+1 through $w_λ$ and in the same column as $X_0, X_1, \ldots,$ or $X_K$;
        $X_{K+1}$ is in slice S, and is different from $X_0$, $X_1, \ldots,$ and $X_K$; $Y_{K+1}$ and $X_{K+1}$ have identical $(λ+1)^{st}$ to $D^{th}$ target coordinates. There will always be such a pair of signals.
7.     END FOR K
8.     LOOP:
9.       Swap signal Z with signal $X_K$
10.       IF K = 0 THEN BREAK from the LOOP
11.       SET Z = $Y_K$
12.       Z is now in the same column as some $X_J$. SET K to this J.
13.     END LOOP
14.   END WHILE
15. END FOR S Algorithm 2 works by "fixing" one slice at a time, i.e., once a slice is fixed, its signals are not changed in successive calls to the algorithm. The WHILE condition of step 2 checks the current slice for precisely the property that Algorithm 2 is trying to eliminate. When this property is no longer found, that slice is fixed. A fairly small number of times through Steps 3–13 always fixes a slice.

The goal of Steps 3–13 is to move a signal with "duplicate" $(λ+1)^{st}$ to $D^{th}$ target coordinates out of layer S, replacing it with some other signal from above layer S whose $(λ+1)^{st}$ to $D^{th}$ target coordinates are missing from layer S. In the ideal case where these two signals are in the same column, Algorithm 2 just swaps the two signals. However, such a pair of signals may not be in the same column, so a chain of swaps are performed, each of which operates within a different column. The first swap operation moves a signal with missing $(Xλ30\ 1)^{st}$ to $D^{th}$ target coordinates into layer S, and the last swap operation moves a signal with duplicate $(λ+1)^{st}$ to $D^{th}$ target coordinates out of layer S.

FIG. 4A shows an example of a mapping between the input and output terminals of MSAP 300. FIG. 4B shows an example of how the position coordinates of the input signals of a 12-by-12 MSAP are changed from their starting position coordinates to their target position coordinates. The changes in position coordinates were determined using Algorithm 1 and Algorithm 2 above. Layer $L_1$ only changes the coordinates of the first dimension, layer $L_2$ only changes the coordinates of the second dimension, and layer $L_3$ only changes the coordinates of the first dimension.

An advantage of an MSAP is that it efficiently uses pre-selected switches as basic building blocks. The simplest and most efficient MSAP's use only n:1 switches (n being an integer) to permute $N=n^D$ signals. In such a case, there are 2D−1 layers, each containing N switches. Because $D=\log_n N$, there is a total of $N \times (2 \log_n N−1)$ n:1 switches. Therefore, the amount of logic circuitry required to construct an MSAP using pre-selected switches with fixed switch sizes is on the order of N log N.

A comparison of the efficiency of MSAP's constructed using switches of various sizes is given below in Table 1. Here, it is assumed that larger switches are built from smaller switches. Table 1 shows that an MSAP using larger switch sizes requires more logic circuitry. For example, if 2:1 switches are available, then building an N=64 MSAP is the most efficient using eleven 6-dimensional layers of 2:1 switches. Using five 3-dimensional layers of 4:1 switches requires 36% more logic circuitry. Using three 2-dimensional layers of 8:1 switches requires 91% more logic circuitry. Using one one-dimensional layer of 64:1 switches (effectively a set of parallel multiplexers) requires 473% more logic circuitry.

TABLE 1

| n | n:1 switches per layer | Layers | Total n:1 switches | 2:1 switches comprising each n:1 switch (= n − 1) | Equivalent total 2:1 switches | Ratio vs. n = 2 | Difference vs. n = 2 |
| --- | --- | --- | --- | --- | --- | --- | --- |
| 2 | 64 | 11 | 704 | 1 | 704 | 100% | 0% |
| 4 | 64 | 5 | 320 | 3 | 960 | 136% | 36% |
| 8 | 64 | 3 | 192 | 7 | 1344 | 191% | 91% |
| 64 | 64 | 1 | 64 | 63 | 4032 | 573% | 473% |

Figure 5A:
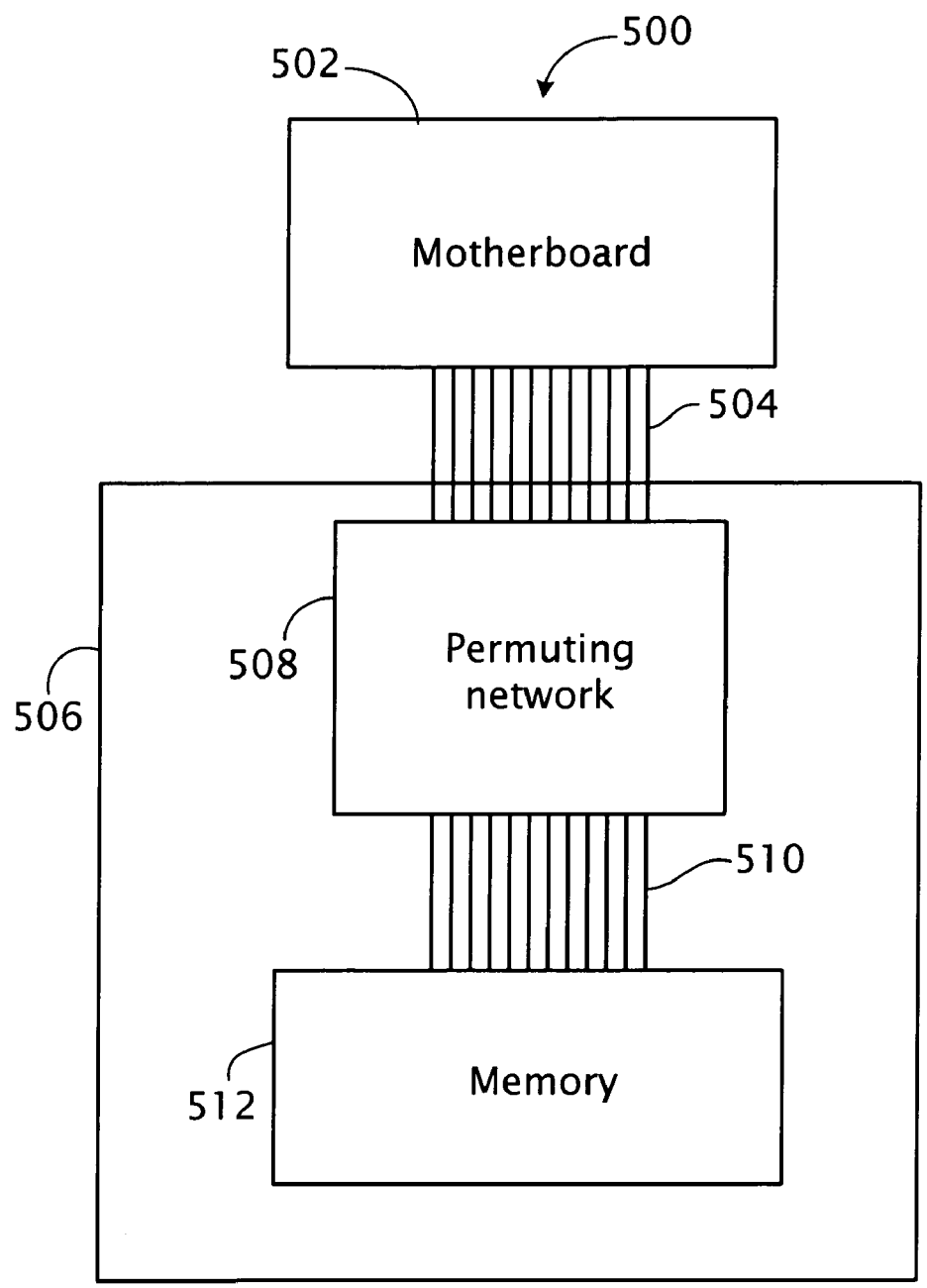
FIG. 5A is a schematic diagram of a computer having a permuting network.

An application of an MSAP is to permute signals between a motherboard and a daughter board in a computer. Referring to FIG. 5A, a computer 500 includes a daughter board 506 coupled to a motherboard 502 through an interface 504 that has signals lines #1 to #12. The daughter board 506 includes a memory 512 that can be accessed by motherboard 502. Daughter board 506 and motherboard 502 are manufactured by different companies so that motherboard 502 sends signals on the signal lines of interface 504 in an order that is different from the order recognized by memory 512.

Figure 5B:
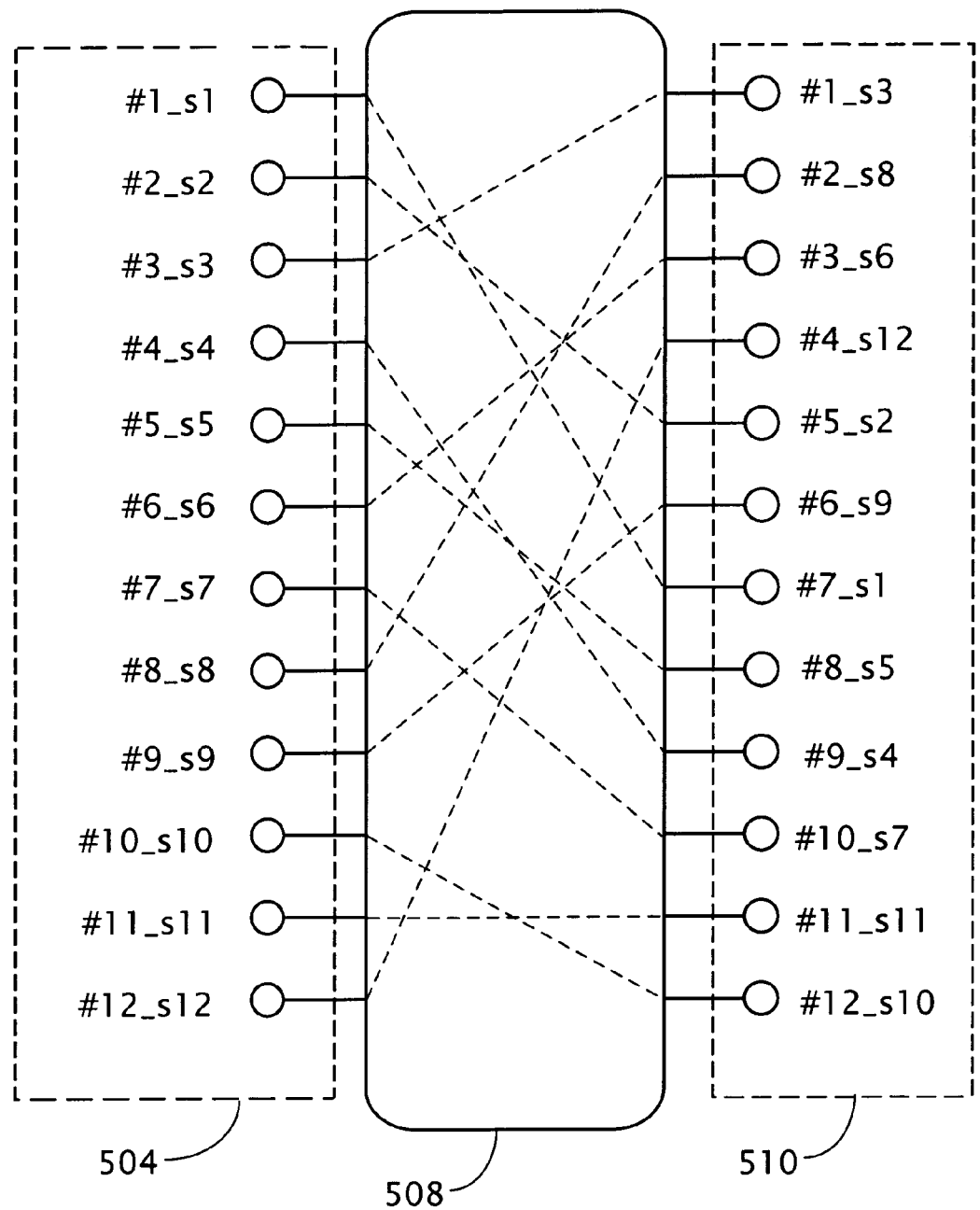
FIG. 5B is a diagram of a mapping between the input and output terminals of the permuting network of FIG. 5A.

Daughter board 506 includes a permuting network 508 that has input terminals connected to interface 504 and output terminals connected to an interface 510, which in turn is connected to memory 512. Permuting network 508 routes the signals in the signal lines of interface 504 to the signal lines of interface 510 with a new ordering that is acceptable to memory 512. The mapping between signal lines of interface 504 and signal lines of interface 510 is shown in FIG. 5B. As an example, the signal s1 is line #1 of interface 504 is mapped to line #7 of interface 510, and signal s12 on line #12 of interface 504 is mapped to line #4 of interface 510. Similarly, the signals sent from memory 512 are re-ordered by permuting network 508 and then passed on to motherboard 502.

Permuting network 508 is implemented using a field programmable logic array (FPGA). The FPGA includes configurable logic components, each of which can be programmed to receive a number of inputs and to pass any one of the inputs to its outputs, just like an n:1 switch. When computer 500 is first booted, daughter board 506 communicates with motherboard 502 to determine the required permutation. A processor (not shown) on daughter board 506 executes an MSAP switching algorithm to program the configurable logic components to construct an MSAP that achieves the required permutation.

Figure 6:
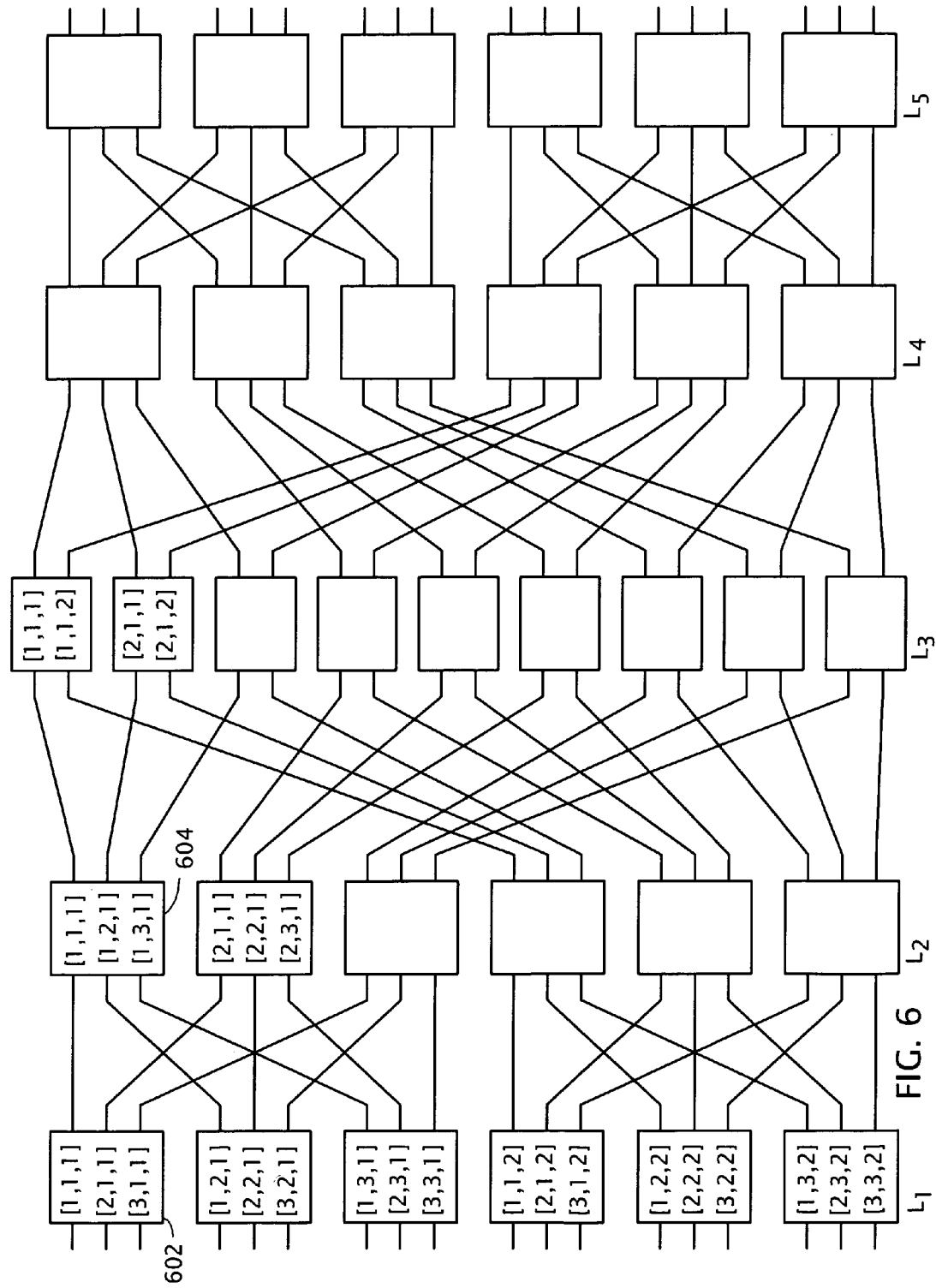
FIG. 6 is a schematic diagram of a permuting network.

In the example shown in FIG. 6, a 18-by-18 MSAP 600 is constructed from four layers of 3:1 switches and one layer of 2:1 switches. In this example, $N=18=3\times3\times2$, $D=3$, $\omega_1=3$, $\omega_2=3$, and $\omega_3=3$. MSAP 600 includes layers $L_1$ to $L_5$. Layers $L_1$, $L_2$, $L_4$, and $L_5$ include 3:1 switches that are configured to form 3-by-3 permuters. Layer $L_3$ includes 2:1 switches that are configured to form 2-by-2 permuters. Within each permuter, different switches select different input signals so that there is no overlap in their selections. This results in a re-ordering of the input signals appearing at the output terminals of the permuter.

In FIG. 6, the switch labels are shown inside the permuters. The three switches in a permuter 602 in layer $L_1$ have the same $2^{nd}$ and $3^{rd}$ coordinates but different $1^{st}$ coordinates. Thus, permuter 602 permutes the position coordinates of input signals in the first dimension. Likewise, other permuters in layer $L_1$ also permute the position coordinates of input signals in the first dimension. The three switches in a permuter 604 in layer $L_2$ have the same $1^{st}$ and $3^{rd}$ coordinates but different $2^{nd}$ coordinates. Thus, permuter 604 permutes the position coordinates of input signals in the second dimension. Likewise, other permuters in layer $L_2$ also permute the position coordinates of input signals in the second dimension.

In a similar manner, permuters in layer $L_3$ permute the position coordinates of input signals in the third dimension. Permuters in layer $L_4$ permute the position coordinates of input signals in the second dimension. Permuters in layer $L_5$ permute the position coordinates of input signals in the first dimension. Each of the output signals of a permuter in layer $L_1$ is sent to a different permuter in layer $L_2$, each of the output signals of a permuter in layer $L_2$ is sent to a different permuter in layer $L_3$, and so forth.

MSAP 600 is designed to allow any of the 18 input signals to be routed to any of the 18 output terminals. In operation, the MSAP switching algorithm is performed to determine the transition paths for the 18 input signals. The transition paths go through the five layers of switches in a way such that each signal is routed to the desired output terminal and that no two signals occupy the same switch. The switches are then programmed to select input signals according to the signal paths determined by the MSAP switching algorithm.

Other embodiments are within the scope of the following claims. For example, the switches may be implemented using devices other than an FPGA. The switches may be programmed by a processor on the motherboard rather than by a processor on the daughter board. The configuration of switches (i.e., which signal is selected from its inputs and reflected at the output) may be dynamically programmable, or be programmable once and then fixed permanently. An MSAP that performs bit permutations can be used as a building block of an encoder/decoder that encrypts/decrypts messages. The MSAP can be used to construct telecommunication networks to route signals from nodes at one location to nodes at another location in a non-blocking manner. The MSAP can also be used in massively parallel or supercomputing applications to route signals among different processors.

What is claimed is:

1. A method comprising:
   determining integer factors of N, in which N represents the number of signals to be permuted;
   selecting a configuration for layers of a permuting network based on the integer factors of N and on one or more pre-selected types of switches; and
   constructing the permuting network in layers by using the one or more pre-selected types of switches based on the selected configuration, the constructing comprising
   assigning multi-dimensional coordinates to the switches, each switch having a coordinate that is the same as another switch in the next layer, each layer except the last layer having at least two switches that have coordinates that are different from coordinates of switches in corresponding positions in the next layer.

2. The method of claim 1 in which each of the types of switches is capable of selecting one signal from among a number of signals, the number being different for different types of switches.

3. The method of claim 2 in which each of the integer factors corresponds to the number of signals that one type of switches can select from.

4. The method of claim 1, further comprising selecting the set of prime integer factors $\omega_1, \omega_2, \ldots, \omega_D$ (D being an integer) such that $N=\omega_1\times\omega_2\times\ldots\times\omega_D$.

5. The method of claim 4 in which the permuting network is configured to have 2D−1 layers of switches, the switches including $\omega_1:1, \omega_2:1, \ldots,$ and $\omega_D:1$ switches or are constructed from $\omega_1:1, \omega_2:1, \ldots,$ and $\omega_D:1$ switches.

6. A method comprising:
   receiving N signals;
   determining integer factors of N; and
   constructing a permuting network using layers of switches having a configuration based on the integer factors of N and on one or more pre-selected types of switches, each layer has N switches of the same type, the constructing comprising
   assigning multi-dimensional coordinates to the switches, each switch having a coordinate that is the same as another switch in the next layer, each layer except the last layer having at least two switches that have coordinates that are different from coordinates of switches in corresponding positions in the next layer;
   re-ordering the N signals using the permuting network.

7. The method of claim 6 in which each type of switch has a predefined number of input terminals and one output terminal.

8. The method of claim 7 in which each layer of the permuting network groups the N signals into subsets of signals and permutes the ordering of the subsets of signals, the number of signals in the subsets being equal to the number of input terminals that each switch in the layer has.

9. The method of claim 7 in which each switch in a layer has a different coordinate, and constructing the permuting network comprises configuring the switches so that when a signal propagates from a first switch in one layer to a second switch in the next layer, the coordinates of the two switches differ in at most one dimension.

10. The method of claim 6 in which the integer factors are $\omega_1, \omega_2, \ldots, \omega_D$ (D being an integer) such that $N=\omega_1 \times \omega_2 \times \ldots \omega_D$, and the pre-selected types of switches include $\omega_1:1, \omega_2:1, \ldots,$ and $\omega_D:1$ switches.

11. Apparatus comprising:
N input terminals, in which N is an integer, $N=\omega_1 \times \omega_2 \times \ldots \times \omega_D$, $\omega_1, \omega_2, \ldots, \omega_D$ are integer factors of N, and at least two of $\omega_1, \omega_2, \ldots, \omega_D$ are different from each other;
N output terminals; and
a permuting network to form non-blocking signal paths that connects the input terminals to the output terminals in an arbitrary order, the permuting network constructed from layers of switches that include $\omega_1:1$, $\omega_2:1, \ldots,$ and $\omega_D:1$ switches or are constructed from $\omega_1:1, \omega_2:1, \ldots,$ and $\omega_D:1$ switches, each layer having the same number of switches of the same type;
wherein the permuting network is constructed by assigning multi-dimensional coordinates to the switches, each switch having a coordinate that is the same as another switch in the next layer, each layer except the last layer having at least two switches that have coordinates that are different from coordinates of switches in corresponding positions in the next layer, and configuring the switches so that when a signal propagates from a first switch in one layer to a second switch in the next layer, the coordinates of the two switches differ in at most one dimension.

12. The apparatus of claim 11 wherein each switch has input and output terminals, the input terminals of the switches in the first layer coupled to the N input terminals of the apparatus, the output terminals of the switches in the last layer coupled to the N output terminals of the apparatus, and for all layers except the last layer, the output terminals of the switches are connected to the input terminals of the switches in the next layer.

13. The apparatus of claim 12 in which the number of layers and the connection between switches of successive layers are based on a set of integer factors of N and on the types of switches used.

14. The apparatus of claim 13 in which the permuting network is configured to have 2D−1 layers of switches, each layer permuting the order of different subsets of signal paths.

15. The apparatus of claim 14 wherein for each p-th layer of switches, p ranging from 1 to D, $\omega_p:1$ switches are configured to form $\omega_p$-by-$\omega_p$ permuters that are capable of permuting the ordering of $\omega_p$ signal paths, and for each of the q-th layer of switches, q ranging from D+1 to 2D−1, $\omega_{2D-q}:1$ switches are configured to form $\omega_{2D-q}$-by-$\omega_{2D-q}$ permuters that are capable of permuting the ordering of $\omega_{2D-q}$ signal paths.

16. The apparatus of claim 15 in which each of the input terminals of each permuter in the $2^{nd}$ layer to the $(2D-1)^{th}$ layer is connected to the output terminal of a different permuter in the previous layer.

17. Apparatus comprising:
a first active device pre-configured to generate N signals having a first ordering, in which N is an integer, $N=\omega_1 \times \omega_2 \times \ldots \times \omega_D$, $\omega_1, \omega_2, \ldots, \omega_D$ are integer factors of N, and at least two of $\omega_1, \omega_2, \ldots, \omega_D$ are different from each other;
a second active device pre-configured to accept the N signals arranged in a second ordering; and
a permuting network to receive the N signals having the first ordering and re-order the N signals so that the N signals have the second ordering acceptable by the second device, the permuting network constructed from layers of switches that include $\omega_1:1, \omega_2:1, \ldots,$ and $\omega_D:1$ switches or are constructed from $\omega_1:1, \omega_2:1, \ldots,$ and $\omega_D:1$ switches, each layer having the same number of switches of the same type.

18. The apparatus of claim 17 in which the number of layers and the connection between switches of successive layers are based on a set of integer factors of N and on the types of switches used.

19. The apparatus of claim 18 in which the second device is a memory.

20. The apparatus of claim 19 in which the first device is a computer motherboard.

21. The apparatus of claim 18 in which the permuting network is configured to have 2D−1 layers of switches, each layer having N switches of the same type, each layer permuting the order of different subsets of the N signals.

22. The apparatus of claim 17 in which the permuting network comprises a field programmable logic array.

23. A computer program stored on a computer-readable media for causing a computer system to perform the functions of:
determining integer factors $\omega_1, \omega_2, \ldots,$ and $\omega_D$ of N such that $N \times \omega_1 \times \omega_2 \times \ldots \times \omega_D$, N and D both being integers;
assigning a D-dimensional coordinate to each of a set of N signals;
in successive operations, changing the coordinates of the N signals for a particular dimension during each operation, such that no two signals have the same coordinates after each operation, so that after the successive operations, the coordinates of the N signals match a set of target coordinates;
wherein for each operation, each signal prior to the operation has a coordinate that is the same as another signal after the operation.

24. The computer program of claim 23 in which the multi-dimensional coordinates are [x1, x2, . . . , xD], xk ranging from 1 to wk for each k, k ranging from 1 to D.

25. The computer program of claim 24 in which the coordinates of the N signals are changed by swapping the coordinates of a pair of signals.

26. The computer program of claim 23, further comprising configuring switches in a permuting network based on the changes of coordinates in the successive operations.

27. Apparatus for re-ordering N signals, comprising:
(2D−1) layers of switches, D being an integer, the n-th layer and (2D−n)-th layer having $\omega_n$-by-$\omega_n$ switches, n ranging from 1 to D, and $\omega_1$ to $\omega_D$ being integer factors of N such that $N=\omega_1 \times \omega_2 \times \ldots \times \omega_D$, and at least two of $\omega_1, \omega_2, \ldots, \omega_D$ are different from each other, the first layer of switches re-ordering the order of N signals to generate a first set of re-ordered signals, the i-th layer of switches re-ordering the (i−1)-th set of re-ordered signals to generate an i-th set of re-ordered signals, i ranging from 2 to 2D−1, the (2D−1)-th set of re-ordered signals matching a target ordering of N signals, wherein each of N signals are assigned D-dimensional coordinates, the n-th coordinate ranging from 1 to $\omega_n$, the p-th layer switches configured to swap signals that differ only in the p-th coordinates with the coordinates in other dimensions being the same, p ranging from 1 to D, and the q-th layer switches configured to swap signals that differ only in the (2D−q)-th coordinates with the coordinates in other dimensions being the same, q ranging from D+1 to 2D−1.

28. A method of reordering N signals using (2D−1) layers of switches, N and D both being integers, the method comprising:

determining integer factors $\omega_1, \omega_2, \ldots,$ and $\omega_D$ of N such that $N = \omega_1 \times \omega_2 \times \ldots \times \omega_D$;

assigning a D-dimensional coordinate to each of a set of N signals, the n-th coordinate ranging from 1 to $\omega_n$;

swapping, using the p-th layer switches, signals that differ only in the p-th coordinates with the coordinates in other dimensions being the same, p ranging from 1 to D; and swapping, using the q-th layer switches, signals that differ only in the (2D−q)-th coordinates with the coordinates in other dimensions being the same, q ranging from D+1 to 2D−1.

* * * * *